United States Patent Office 3,416,327
Patented Dec. 17, 1968

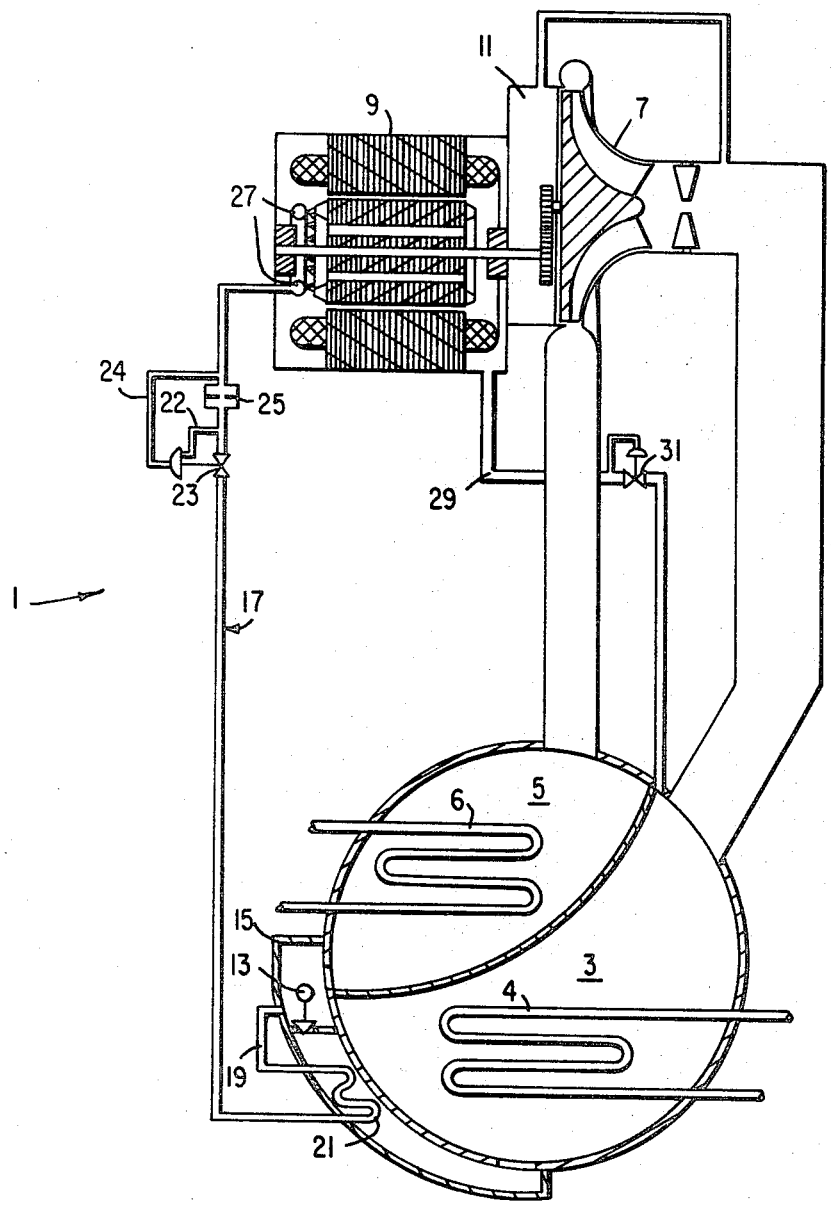

3,416,327
REFRIGERATION MACHINE
George J. Akerhielm and James W. Endress, Syracuse, N.Y., assignors to Carrier Corporation, Syracuse, N.Y., a corporation of Delaware
Filed Feb. 2, 1967, Ser. No. 613,605
3 Claims. (Cl. 62—115)

ABSTRACT OF THE DISCLOSURE

A refrigeration compressor motor cooling circuit having a fixed orifice to regulate flow of refrigerant therethrough with a pressure regulator upstream therefrom to maintain a constant pressure drop across the orifice to maintain a steady flow of refrigerant to the motor irrespective of the pressure drop across the machine.

BACKGROUND OF THE INVENTION

This invention pertains to refrigeration machines employing refrigerant cooled compressor motors.

In large tonnage refrigeration machines, it is common to utilize liquid refrigerant as a coolant to maintain the compressor motor temperature at a safe level. Liquid refrigerant from the high pressure side of the machine is provided to the motor, where it absorbs the heat produced thereby and is partially vaporized. The liquid and gaseous refrigerant from the motor is vented to a portion of the machine which is at a pressure lower than high side pressure. The most economical and trouble-free way to circulate refrigerant through the motor cooling circuit is by relying the pressure drop to force refrigerant therethrough.

While this is satisfactory under normal operating conditions, it should be realized that due to refrigeration machine temperature variations, the pressure drop across the machine and the motor cooling circuit will vary which in turn varies the refrigerant flow to the compressor motor causing overheating thereof at low head pressures and flooding thereof at high head pressure. In high pressure refrigeration machines, the pressure variations cover a wider range, thereby requiring a much more critical control of refrigerant flow through the motor cooling circuit than has been heretofore necessary.

SUMMARY OF THE INVENTION

This invention is directed to a refrigeration machine motor cooling circuit which is capable of providing the proper flow of refrigerant to the compressor motor over a wide range of operating conditions. A pressure regulating valve, upstream from a fixed flow control orifice responsive to the pressures on both sides of the orifice, is utilized to maintain a constant pressure drop across the orifice. Since the orifice is fixed and a constant pressure drop is maintained across the orifice, the refrigerant flow through the cooling circuit will be constant irrespective of the pressures prevailing in the machine.

BRIEF DESCRIPTION OF THE DRAWING

The drawing is a schematic view of a refrigeration machine incorporating the refrigerant flow control means of our improved motor cooling refrigerant circuit.

DESCRIPTION OF THE PREFERRED EMBODIMENT

Referring more particularly to the drawing, there is shown a refrigeration machine 1 having an evaporator 3, a condenser 5, a refrigerant compressor 7, a compressor motor 9 and motor compressor transmission 11. Tubing 6 is disposed in the condenser for passage therethrough of cooling water from a suitable source, such as a cooling tower (not shown). Tubing 4 is disposed in the evaporator for passage therethrough of a medium to be cooled. A float valve 13 is provided in float chamber 15 to regulate the flow of liquid refrigerant from the condenser to the evaporator.

Compressor motor 9 is provided with liquid refrigerant for cooling purposes thereof through motor cooling circuit 17.

Liquid refrigerant from float chamber 15 is conveyed through line 19 subcooling loop 21, pressure regulating valve 23, flow restricting orifice 25 and refrigerant spray nozzles 27 to motor 9. A vent line 29 is provided to drain refrigerant from the motor to the evaporator. A valve 31 in vent line 29 responsive to the refrigerant pressure in drain line 29 upstream from the valve maintains the motor at a slightly higher pressure than the evaporator to minimize lubricant migration from motor compressor transmission 11 into the motor housing.

It should be understood that the motor pressure is basically low side pressure, the difference between evaporator pressure and motor pressure being approximately one half pound per square inch. It is desirable to keep this pressure difference as low as possible to obtain the greatest possible pressure drop across the motor cooling circuit while providing a sufficient pressure difference between the motor housing and transmission to prevent the entrance of transmission lubricant into the motor housing.

Pressure regulating valve 23 is provided with a control line 22 for sensing the pressure between valve 23 and orifice 25 and a control line 24 for sensing the pressure immediately downwstream from orifice 25. By controlling valve 23 in response to the two aforementioned pressures, a constant pressure drop is maintained across orifice 25 by valve 23, thereby insuring a constant flow of refrigerant to motor 9 irrespective of condenser or evaporator pressure.

While we have described a preferred embodiment of our invention, it will be understood that the invention is not limited thereto, but may be otherwise embodied within the scope of the following claims.

We claim:
1. A method of cooling the compressor motor in a refrigeration machine comprising the steps of:
    passing liquid refrigerant from the high pressure side of the machine to the motor;
    restricting the flow of refrigerant to the motor;
    regulating the flow of refrigerant upstream from the location of said restriction responsive to pressure to maintain a constant pressure drop therethrough; and
    passing the refrigerant from the motor to the low side of the refrigeration machine.
2. A compressor motor cooling circuit for use in a refrigeration machine comprising:
    a refrigerant supply line communicating between the high pressure side of the machine and the motor to provide liquid refrigerant thereto;
    a refrigerant vent line communicating between the motor and a portion of the machine having a pressure lower than high side pressure for venting refrigerant from the motor;
    flow restricting means disposed in said refrigerant supply lines for restricting flow of refrigerant to the motor; and
    regulating means responsive to machine operating conditions to maintain a constant pressure drop across said flow restricting means to provide constant flow of refrigerant through said supply line irrespective of refrigeration machine operating conditions.

3. A motor cooling circuit according to claim 2 wherein said first flow restricting means comprises a fixed orifice and said regulating means comprises a pressure regulating valve responsive to refrigerant pressures immediately upstream and downstream from said flow restricting means to maintain a constant pressure drop across said flow restricting means.

References Cited

UNITED STATES PATENTS 3,241,331   3/1966   Endress _____ 62—505 XR

MEYER PERLIN, *Primary Examiner.*

U.S. Cl. X.R.

62—505